(12) United States Patent
Hajianpour

(10) Patent No.: US 6,843,456 B1
(45) Date of Patent: Jan. 18, 2005

(54) ARTICLE HOLDER WITH ATTACHMENT CLIP

(76) Inventor: Zoya Hajianpour, 1706 Vestal Dr., Coral Springs, FL (US) 33071

( * ) Notice: Subject to any disclaimer, the term of this patent is extended or adjusted under 35 U.S.C. 154(b) by 0 days.

(21) Appl. No.: 10/336,467

(22) Filed: Jan. 3, 2003

(51) Int. Cl.⁷ .............................................. B62J 11/00
(52) U.S. Cl. ............................. 248/230.1; 248/316.1; 248/313; 224/414; 224/441
(58) Field of Search .......................... 248/316.1, 311.2, 248/313, 230.1, 230.4, 230.5, 230.8; 224/414, 441, 444, 448, 412

(56) References Cited

U.S. PATENT DOCUMENTS

| | | | |
|---|---|---|---|
| 3,632,069 A | * | 1/1972 | Thayer et al. ................. 248/56 |
| 4,570,835 A | * | 2/1986 | Criqui et al. ................ 224/414 |
| 4,767,092 A | * | 8/1988 | Weatherly ................. 248/311.2 |
| 4,841,839 A | * | 6/1989 | Stuart ......................... 89/37.04 |
| 4,852,840 A | * | 8/1989 | Marks ...................... 248/230.4 |
| 5,199,678 A | | 4/1993 | Luebke ..................... 248/311.2 |
| 5,249,770 A | | 10/1993 | Louthan ................... 248/311.2 |
| 5,299,720 A | | 4/1994 | Koch, III ..................... 224/35 |
| 5,325,991 A | | 7/1994 | Williams ..................... 220/739 |
| 5,390,887 A | | 2/1995 | Campbell ................. 248/311.2 |
| 5,400,990 A | * | 3/1995 | Frankel ....................... 248/215 |
| 5,425,484 A | | 6/1995 | Kawand et al. ................ 224/32 |
| 5,597,087 A | | 1/1997 | Vinarsky ..................... 220/482 |
| 5,695,162 A | * | 12/1997 | DiCastro ............... 248/231.81 |
| 5,833,188 A | * | 11/1998 | Studdiford et al. ..... 248/229.17 |
| 5,966,865 A | * | 10/1999 | Jones ......................... 47/41.01 |
| 6,004,033 A | | 12/1999 | Cirone ......................... 383/24 |
| 6,019,335 A | * | 2/2000 | Sehati ......................... 248/312 |
| 6,095,386 A | * | 8/2000 | Kuo ............................ 224/448 |
| 6,186,454 B1 | * | 2/2001 | Olsen ....................... 248/218.4 |
| 6,401,993 B1 | | 6/2002 | Andrino ................. 224/148.5 |
| 6,536,727 B1 | * | 3/2003 | Limber et al. ......... 248/229.16 |
| 6,631,876 B1 | * | 10/2003 | Phillips ..................... 248/74.2 |

* cited by examiner

Primary Examiner—Ramon O. Ramirez
Assistant Examiner—Steven Marsh
(74) Attorney, Agent, or Firm—Ronald V. Davidge

(57) ABSTRACT

An article holder includes a body member, a clamping member pivotally mounted on the body member and a holding member for holding the article. The holding member may include an arcuate surface and a flexible member for holding a cylindrical article, such as a water bottle, against the arcuate surface. Alternately, the holding member may include an open-top box for holding articles. The body member may include a structure for removably attaching different holding members.

8 Claims, 3 Drawing Sheets

ARTICLE HOLDER WITH ATTACHMENT CLIP

BACKGROUND OF THE INVENTION

1. Field of the Invention

This invention relates to a device for removably attaching an article to a fixed support structure, more particularly, to such a device including a holding member for holding a cylindrical object, such as a water bottle, and, yet more particularly, to such a device including multiple holding members.

2. Summary of the Background Art

Many individuals regularly use exercise equipment, such as treadmills and stationary bicycles for extended workouts or for workouts of shorter duration but faster pace. In either case, the person using the equipment often becomes thirsty before the workout period is completed. It is often desirable, both for reasons of personal comfort and for reasons of physical health to replace fluids lost during exercise before the period of using a particular piece of exercise equipment is completed. Yet, it is inconvenient and often undesirable to leave the exercise equipment to obtain water or another drink tailored to replace lost fluids; to interrupt an exercise program may jeopardize its effectiveness. Thus, what is needed is a method for providing water or another fluid to be drunk while using the exercise equipment. Since many types of exercise equipment include handrails or other horizontal bar structures within reach of a person using the equipment, this need can be filled by providing a means to removable attachment of a bottle to such a horizontal structure.

The patent art describes a number of devices for removably attaching water bottles to structural elements by means of loop and hook closure mechanisms, such as VELCRO® closures. For example, U.S. Pat. No. 6,004,033 describes a composite water bottle holder formed by sewing a first edge of a sheet of neoprene material to form a generally cylindrical shaped water straps of bottle holder with a VELCRO® attachment mechanism including mating straps of material. U.S. Pat. No. 5,249,770 describes a holder including a body with a slot through which a flexible strap extends. One side of the strap forms one side of the VELCRO® closure, while the other side of the closure is formed by one or more pads attached to the body. One end of the strap is pulled around the structural element and through a buckle at the opposite end of the strap to be fastened to the pad(s) attached to the body. U.S. Pat. No. 5,199,678 describes a holder of holding a cup on the arm of a chair. The holder includes an "L"-shaped support structure having an upper surface along which one side of the VELCRO® closure extends and a lower surface from which a strap forming the other side of the closure hangs. The support structure is placed atop the chair arm, with the strap extending around the chair arm and along the upper surface of the support structure. What is needed is a lower cost means for removably attaching a bottle holder to a structural element without requiring the use of such closures.

U.S. Pat. No. 5,299,720 describes a combined handle and friction connector for a contained, in which a handle assembly can be either integral with a container or attachable thereto. The handle is spaced from the container by an opening for receiving the hand of the user, and has a snap-on groove for detachably connecting the handle and the associated container to a tubular support having a range of varying diameters. What is needed is a clamp having a plurality of closure positions for supporting attachment to supports having a wider range of shapes and dimensions.

A number of patents, of which U.S. Pat. No. 5,425,484 is exemplary, describe methods for attaching a water bottle to a bicycle so that, while the water bottle is easily removable, a part of the attachment mechanism remains attached to the bicycle, for example, being bolted thereto. Since the bicycle typically belongs to the individual installing and using the water bottle and repeatedly using the bicycle, this remaining attachment portion does not present a serious problem. However, what is needed is a water bottle attachment mechanism that is easily and totally removed from exercise equipment in a gymnasium, so that the equipment can be used by others, and so that the water bottle can be used on other equipment.

U.S. Pat. No. 5,597,087 describes a sports bottle having a hook for suspending the bottle from a support structure. Since sports bottles having a number of desirable features without such a hook are widely available filled with suitable liquids, what is needed is a mechanism for removably attaching an existing water bottle to a support structure. Additionally, since the support surface provided by exercise equipment may move with its use, causing a water bottle simply suspended from a hook to swing, what is needed is a mechanism clamping the water bottle to the support structure.

SUMMARY OF THE INVENTION

According to a first aspect of the invention, a holder is provided for removably attaching an article to a stationary support structure. The holder includes a body member, a clamping member, and a holding member. The body member, which extends between a distal end and a proximal end, includes a first attachment surface at its proximal end. The clamping member, which is pivotally mounted at the distal end of the body member, includes a second attachment surface selectively engaging the first attachment surface in a plurality of attachment positions. The clamping member extends away from the body member in a first direction to provide an attachment space for the stationary support structure. The holding member extends away from the body member opposite the first direction for holding the article to the body member.

In one embodiment of the invention, the first attachment surface includes a plurality of teeth disposed adjacent said second attachment surface and spaced apart in said first direction, and said second attachment surface includes a plurality of teeth disposed adjacent said first attachment surface and spaced apart in said first direction. A number of teeth within said plurality of teeth in said first attachment surface selectively engage a number of teeth within said plurality of teeth in said second attachment surface. The clamping member is flexible, so that moving a proximal end of the clamping member away from the proximal end of the body member disengages the second attachment surface from the first attachment surface.

The holding member may include an arcuate surface extending opposite the first direction for holding a cylindrical object, such as a water bottle, and a flexible member to be fastened around the cylindrical article, so that the cylindrical article is held against the arcuate surface. An outer surface of the flexible member includes a first component of a hook and loop fastener, while the inner surface includes the second component of the hook and loop fastener. The flexible member may also include an elastic section. The holding member may formed as an integral part with the body member, or the holding member may be removably attached to the body member.

DETAILED DESCRIPTION OF THE INVENTION

Figure 1:
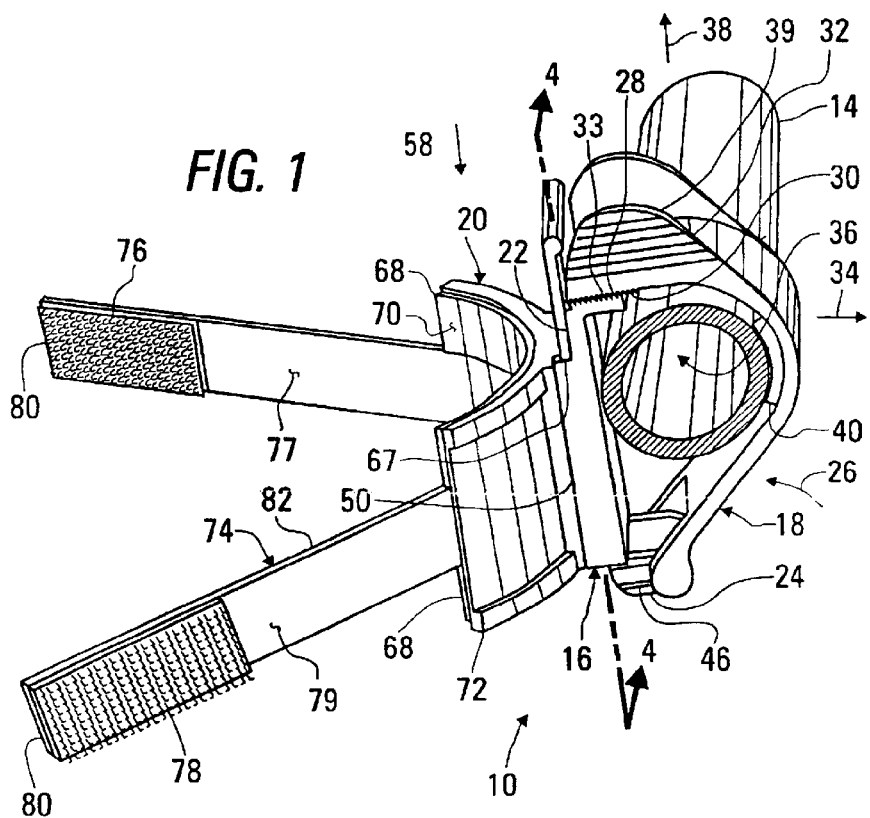
FIG. 1 is a perspective view of an article holder built in accordance with a first embodiment of the invention, as viewed from above and to the right.

FIG. 1 is a left elevation of an article holder 10 built in accordance with a first embodiment of the invention for removable attaching an article, such as a water bottle (not shown) to a stationary support structure 14. For example, the stationary support structure 14 may be the handlebars or a handrail of an exercise device, such as a stationary bicycle or a treadmill.

The article holder 10 includes a body member 16, a clamping member 18 and a holding member 20. The body member 16 extends between a proximal end 22 and a distal end 24. The clamping member 18 is pivotally mounted at the distal end 24 of the body member 16, to be pivoted in the direction of arrow 26 between an open position and the closed position, in which it is shown. With the clamping member in the open position, the article holder 10 released from the stationary support structure 14. With the clamping member in the closed position, the article holder 10 is clamped in place on the stationary support structure 14.

The body member 16 includes a first attachment surface 28 at its proximal end 22, which engages a second attachment surface 30 at the proximal end 32 of the clamping member 18. Both the first attachment surface 28 and the second attachment surface 30 include a number of teeth 33, facing one another so that some of the teeth 33 of the first attachment surface 28 engage some of the teeth 33 of the second attachment surface 30. The clamping member 18 extends away from the body member 16 in the direction of arrow 34 to provide an attachment space 36 through which the stationary support structure 14 extends. The proximal end 32 of the clamping member 18 further extends outward from the proximal end 22 of the body member 16, being deflected outward to hold the attachment surfaces 28, 30 in engagement with one another. Flexibility within the clamping member 18 allows the attachment surfaces 28, 30 to be separated by further deflecting the proximal end 32 of the clamping member 18 outward, in the direction of arrow 38, in a process facilitated by manually gripping a pair of tabs 39 extending outward from the proximal end 32.

The clamping member 18 further includes a soft gripping pad 40 extending into the attachment space 36 to improve the grip of the article holder 10 on the stationary support structure 12. This improvement is achieved by the increased coefficient of friction of the pad 40 relative to the stationary support structure 12 and additionally by the added flexibility provided by the material within the pad 40 to allow conformance with the shape of the stationary support structure 12. The gripping pad 40 is tightened against the stationary support structure 12 by pushing the proximal end 32 of the clamping member 18 opposite the direction of arrow 32. Flexure within the clamping member 18 and compression within the gripping pad 40 maintain a tight fit with the stationary support structure 12 with the attachment surfaces 28, 30 being held together at a position provided by the teeth 33 of these surfaces 28, 30. These teeth 33 provide such positions according to the separation between adjacent teeth 33 in the direction of arrow 32, which is, for example, 1 mm. (0.040 inch).

Figure 2:
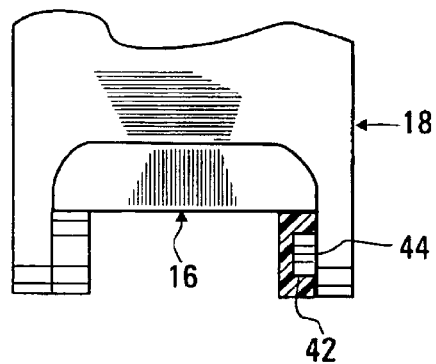
FIG. 2 is a partially sectional fragmentary rear elevation of the article holder of FIG. 1.
Figure 3:
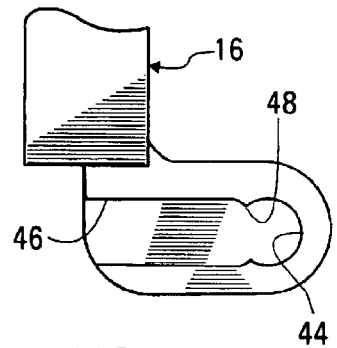
FIG. 3 is a fragmentary right elevation of a body member within the article holder of FIG. 1.

The pivotable mounting of the clamping member 18 will now be discussed, with continued reference to FIG. 1, and with additional reference to FIGS. 2 and 3. FIG. 2 is a partially sectional fragmentary rear view of the article holder 10, while FIG. 3 is a fragmentary right elevation of the body member 16 with the clamping member 18 removed therefrom.

The clamping member 18 is pivotally mounted to the body member 16 by means of a pair of pins 42 extending from the clamping member 18 into apertures 44 in the body member 16. Each of the apertures 44 is connected to an adjacent slot 46, which extends outward to facilitate the assembly of the clamping member 18 to the body member 16. After assembly, detent tabs 48 between each aperture 44 and the adjacent slot 46 hold the pin 42 in place within the aperture 44.

Figure 4:
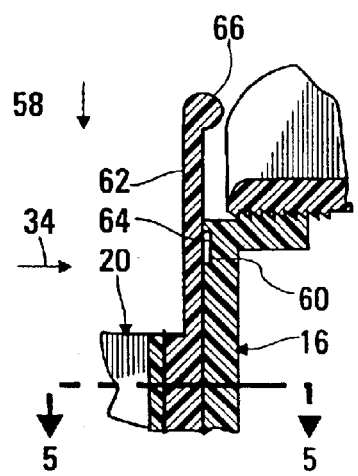
FIG. 4 is a fragmentary cross-sectional view of the article holder of FIG. 1, taken as indicated by section lines 4-4 in FIG. 1.
Figure 5:
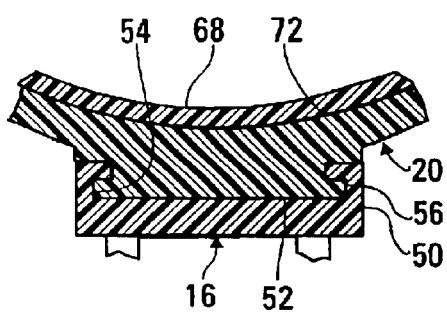
FIG. 5 is a fragmentary cross-sectional plan view of the article holder of FIG. 1, taken as indicate by section lines 5-5 in FIG. 4.

The holding member 20 will now be discussed, with reference being made to FIGS. 4 and 5. FIG. 4 is fragmentary right elevation of the article holder 10, taken as indicated by section lines 4-4 in FIG. 1, and FIG. 5 is a cross-sectional plan view thereof, being taken as indicated by section lines 5-5 in FIG. 4.

In the article holder 10 built in accordance with the first embodiment of the invention, the holding member 20 is removably attached to the body member 16, which includes a track 50 removably receiving an attachment portion 52 of the holding member 20. Specifically, the track 50 includes a pair of inward-facing slots 54 in which outward facing tabs 56 of the attachment portion 52 slide as the holding member 20 is installed on the body member 16 in the direction of arrow 58. After the holding member 20 is installed, a cylindrical tab 60, extending from a flexible detent structure 62 forming a portion of the holding member 20, enters a cavity 64 in the body member 16 to hold the holding member 20 in place. The flexible detent structure 62 extends outward to provide a surface 66 that can be easily moved opposite the direction of arrow 34 to release the holding member 20 for removal from the body member 16.

Referring additionally to FIG. 1, a lower surface 67 of the flexible detent structure 62 contacts the track 50 to prevent movement of the holding member 20 in the direction of arrow 58 beyond the position in which the cylindrical tab 50 moves into place within the cavity 64.

The holding member 20 additionally includes a pair of relatively soft gripping pads 68 forming an arcuate surface 70 extending opposite the direction of arrow 34 for gripping the water bottle (not shown). These gripping pads 68 are supported by an underlying support structure 72 of the holding member 20. The holding member 20 further includes a flexible member 74 that extends outward for attachment around the water bottle (not shown). The flexible member 74 includes a first component 76 of a hook and loop fastener system, such as the fastener system sold under the trademark VELCRO®, extending along a portion of an inner surface 77 of the flexible member 76, and a second component 78 of the fastener system extending along a portion of an outer surface 79 of the flexible member 74. For example, if the first component 76 is the loop component, the second component 78 is hook component. Alternately, if the first component 76 is the hook component, the second component 78 is the loop component. After the opposite ends 80 of the flexible member 74 are pulled around the water bottle 12, the first component 76 is pressed against the first component 78 to hold the water bottle 12 in place against the gripping pads 68. Preferably, the flexible member 74 further includes an elastic section 82 helping to maintain a level of tension established within the first and second components 76, 78 are pressed together. Preferably, the flexible member 74 is at least partly constructed of an elastic material that maintains within this member 74 to help hold the water bottle after the attachment components 76, 78 are fastened together.

The body member 16, clamping member 18, and, holding member 20 are preferably molded from a thermoplastic resin, such as the resin sold under the trademark VALOX®. The gripping pads 40, 68 are preferably composed of a soft thermoplastic resin, being molded along with the clamping member 18 and the support structure 72 of the holding member 20, respectively, as a second shot in a mold, or being made separately to be adhesively attached. The flexible member 74 may be adhesively attached to the support structure 72, or it may be attached thereto by hot upsetting tabs or by mechanical fasteners, such as rivets.

Figure 6:
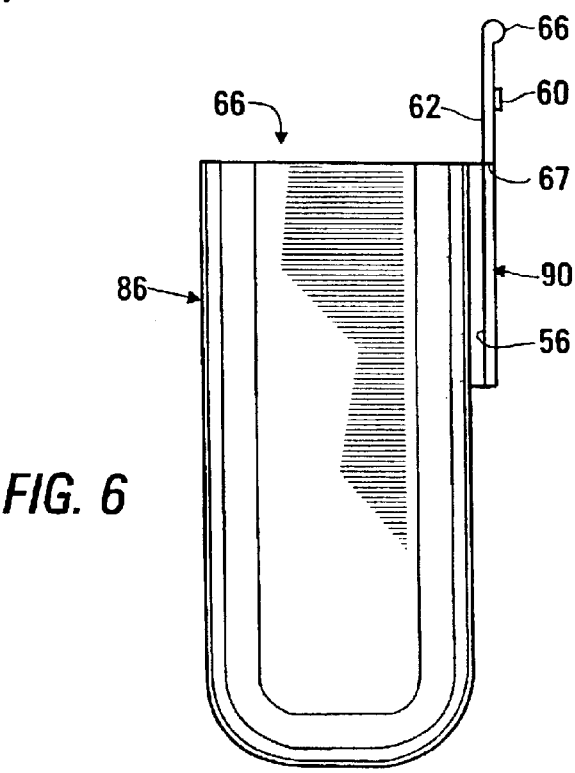
FIG. 6 is a right elevation of a box for alternative attachment to a clip within the article holder of FIG. 1.
Figure 7:
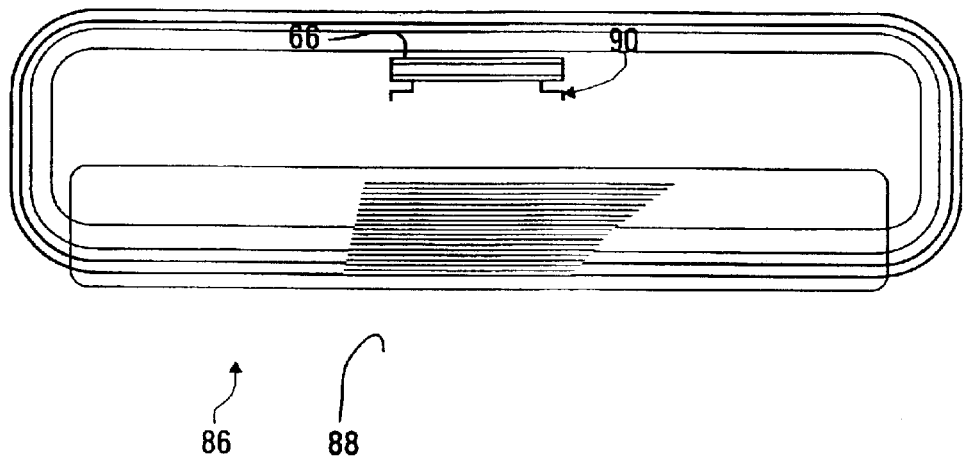
FIG. 7 is a plan view of the box of FIG. 6.

FIGS. 6 and 7 show a box 86 that may be attached to a clamping mechanism including the body member 16 and the clamping member 18 of the article holder 10, in place of the holding member 20. FIG. 6 is a right elevation of the box 86, while FIG. 7 is a plan view thereof. The box 86 has an opening 88 at its top for holding various articles, such as a comb, make-up products, and a cassette or compact disc audio player. The box 86 further includes an attachment portion 90 having various elements described above in reference to FIGS. 4 and 5, which are accorded like reference numerals. These elements include the outward-facing tabs 56 and a flexible detent structure 62 having a cylindrical tab 60, a manually movable surface 66, and lower stopping surfaces 67.

Figure 8:
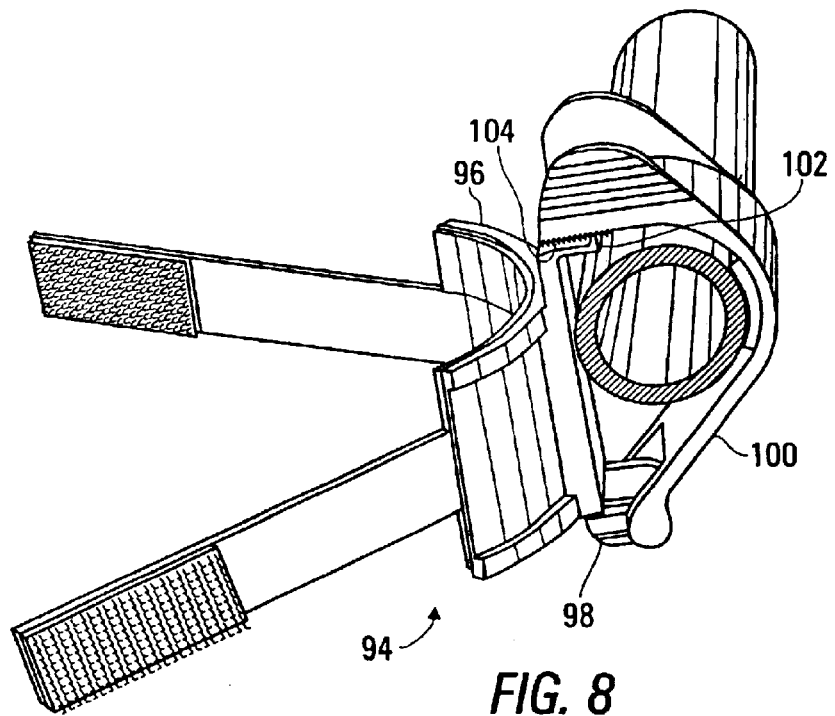
FIG. 8 is a perspective view of an article holder built in accordance with a second embodiment of the invention, as viewed from above and to the right.

FIG. 8 is a perspective view of an article holder 94 built in accordance with a second embodiment of the invention to include a holding member 96 attached as an integral part to the body member 98. Additionally, in the example of FIG. 8, an alternative method of releasably engaging the clamping member 100 to the body member 98 is shown, with the body member 98 having a single ridge 102 to engage one of several grooves or teeth 104 in the clamping member 100. Alternatively, the clamping member may be provided with a single ridge engaging one of several grooves or teeth in the holding member. This article holder 94 is otherwise like the article holder 10, as described above in reference to FIG. 1.

While the invention has been described in terms of its preferred versions or embodiments with some degree of particularity, it is understood that this description has been given only by way of example, and that many variations in the combination and arrangement of parts may be made without departing from the spirit and scope of the invention, as described in the appended claims.

What is claimed is:

1. A holder for removably attaching an article to a stationary support structure, wherein said holder comprises:
   a body member extending between a distal end and a proximal end, including a first attachment surface at said proximal end of said body member wherein said first attachment surface includes a plurality of grooves disposed adjacent said second attachment surface and spaced apart in said first direction;
   a clamping member, pivotally mounted by at least one pin at said distal end of said body member to move between an open position releasing said holder from said stationary support structure and a closed position clamping said holder in place on said stationary support structure, including a second attachment surface selectively engaging said first attachment surface in a plurality of attachment positions, wherein said clamping member extends away from said body member in a first direction to provide an attachment space for said stationary support structure, and wherein said second attachment surface includes a ridge disposed adjacent said first attachment surface and selectively positioned within each groove in said plurality of grooves in said first attachment surface; and
   a holding member extending away from said body member opposite said first direction for holding said article to said body member.

2. A holder for removably attaching an article to a stationary support structure, wherein said holder comprises:
   a body member extending between a distal end and a proximal end, including a first attachment surface at said proximal end of said body member;
   a clamping member, pivotally mounted by at least one pin at said distal end of said body member to move between an open position releasing said holder from said stationary support structure and a closed position clamping said holder in place on said stationary support structure, including a second attachment surface selectively engaging said first attachment surface in a plurality of attachment positions, wherein said clamping member extends away from said body member in a first direction to provide an attachment space for said stationary support structure, wherein said second attachment surface includes a plurality of grooves disposed adjacent said first attachment surface and spaced apart in said first direction, and wherein said first attachment surface includes a ridge disposed adjacent said second attachment surface and selectively positioned within each groove in said plurality of grooves in said second attachment surface; and
   a holding member extending away from said body member opposite said first direction for holding said article to said body member.

3. A holder for removably attaching an article to a stationary support structure, wherein said holder comprises:
   a body member extending between a distal end and a proximal end, including a first attachment surface at said proximal end of said body member, wherein said first attachment surface includes a plurality of teeth disposed adjacent said second attachment surface and spaced apart in said first direction;
   a clamping member, pivotally mounted by at least one pin at said distal end of said body member to move between an open position releasing said holder from said stationary support structure and a closed position clamping said holder in place on said stationary support structure, including a second attachment surface selectively engaging said first attachment surface in a plurality of attachment positions, wherein said clamping member extends away from said body member in a first direction to provide an attachment space for said stationary support structure, wherein said second attachment surface includes a plurality of teeth disposed adjacent said first attachment surface and spaced apart in said first direction, and wherein a number of teeth within said plurality of teeth in said first attachment surface selectively engage a number of teeth within said plurality of teeth in said second attachment surface; and a holding member extending away from said body member opposite said first direction for holding said article to said body member.

4. A holder for removably attaching an article to a stationary support structure, wherein said holder comprises:

a body member extending between a distal end and a proximal end, including a first attachment surface at said proximal end of said body member;

a clamping member pivotally mounted at said distal end of said body member by a pair of pins extending within apertures, wherein a slot extends outward from each of said apertures, wherein a detent tab extends into said slot adjacent each of said apertures, wherein said clamping member includes a second attachment surface selectively engaging said first attachment surface in a plurality of attachment positions, and wherein said clamping member extends away from said body member in a first direction to provide an attachment space for said stationary support structure; and a holding member extending away from said body member opposite said first direction for holding said article to said body member.

5. A holder for removably attaching an article to a stationary support structure, wherein said holder comprises:

a body member extending between a distal end and a proximal end, including a first attachment surface at said proximal end of said body member;

a clamping member, pivotally mounted by at least one pin at said distal end of said body member to move between an open position releasing said holder from said stationary support structure and a closed position clamping said holder in place on said stationary support structure, including a second attachment surface selectively engaging said first attachment surface in a plurality of attachment positions, wherein said clamping member extends away from said body member in a first direction to provide an attachment space for said stationary support structure; and a holding member extending away from said body member opposite said first direction for holding said article to said body member, wherein said holding member comprises an open-topped box for holding said article.

6. A clamping apparatus for removable attachment to a stationary support structure, wherein said clamping apparatus comprises:

a body member extending between a distal end and a proximal end, including a first attachment surface at said proximal end of said body member and a holder attachment surface for removably attaching a holder to extend away from said body member in a first direction, wherein said holder attachment surface includes a track for receiving an attachment portion of said holder as said attachment portion is inserted into said track in a second direction, and a detent structure for holding said attachment portion of said holder in said track;

a clamping member, pivotally mounted by at least one pin at said distal end of said body member to move between an open position releasing said holder from said stationary support structure and a closed position clamping said holder in place on said stationary support structure, including a second attachment surface selectively engaging said first attachment surface in a plurality of attachment positions, wherein said clamping member extends away from said body member opposite said first direction to provide an attachment space for said stationary support structure.

7. The clamping apparatus of claim 6, additionally comprising a first holder including:

an arcuate surface extending in said first direction for holding a cylindrical article, a flexible member for fastening around said cylindrical article to hold said cylindrical article to said arcuate surface, an attachment portion engaging said track; and a detent member releasably engaging said detent structure.

8. The clamping apparatus of claim 6, additionally comprising a second holder including:

an open-top box, an attachment portion engaging said track; and a detent member releasably engaging said detent structure.

* * * * *